United States Patent [19]
Kuramoto et al.

[11] 4,118,726
[45] Oct. 3, 1978

[54] EXCHANGEABLE LENSES FOR USE IN INTERNAL LIGHT MEASURING TYPE SINGLE LENS REFLEX CAMERAS

[75] Inventors: Yoshio Kuramoto, Toyonaka; Hiroshi Ueda, Nara; Kyozo Uesugi, Izumi, all of Japan

[73] Assignee: Minolta Camera Kabushiki Kaisha, Osaka, Japan

[21] Appl. No.: 769,832

[22] Filed: Feb. 17, 1977

[30] Foreign Application Priority Data

Feb. 19, 1976 [JP] Japan ............................. 51-17564
Dec. 12, 1976 [JP] Japan ............................ 51-141500

[51] Int. Cl.² ...................... G03B 17/00; G03B 9/02; G03B 7/00
[52] U.S. Cl. ............................. 354/289; 354/60 L; 354/273
[58] Field of Search ............... 354/202, 286, 152, 155, 354/26, 30, 38, 60, 289, 232, 270–273; 350/206, 247

[56] References Cited

U.S. PATENT DOCUMENTS

| 3,618,502 | 11/1971 | Congrove | 354/273 |
| 3,858,225 | 12/1974 | Hasegawa et al. | 354/286 X |
| 3,928,858 | 12/1975 | Sakurada et al. | 354/60 R X |
| 4,037,235 | 7/1977 | Ueda | 354/60 L X |

FOREIGN PATENT DOCUMENTS

| 1,336,559 | 7/1963 | France | 354/273 |
| 1,243,900 | 8/1971 | United Kingdom | 354/155 |
| 1,233,037 | 5/1971 | United Kingdom | 354/152 |

Primary Examiner—Donald A. Griffin
Attorney, Agent, or Firm—Watson, Cole, Grindle & Watson

[57] ABSTRACT

Each exchangeable lens in a series of exchangeable lenses for use in single lens reflex cameras comprises a lens barrel including at least one lens and a diaphragm, a fixed index on the outer surface of the lens barrel, a diaphragm setting ring including f-number graduations ranging from a maximum f-number to a minimum f-number of the exchangeable lens, with the ring rotatable to a plurality of positions to align any one of the f-number graduations to an index so as to be set to a desired f-number. A first projection on the ring is spaced a predetermined first distance, common to each exchangeable lens of the series, from the minimum f-number graduation in the rotational direction of the ring. Thus, the amount of rotation of the first projection with the ring set to a desired f-number corresponds to the step-difference between the minimum and the desired f-number. A second projection of the ring is spaced a predetermined second distance from the maximum f-number graduation in the rotational direction of the ring. The second distance is dependent on the value of the maximum f-number of each exchangeable lens of the series of lenses such that the second projection is at a position dependent on the value of the maximum f-number of the exchangeable lens with the ring set to the maximum f-number.

17 Claims, 12 Drawing Figures

FIG.4
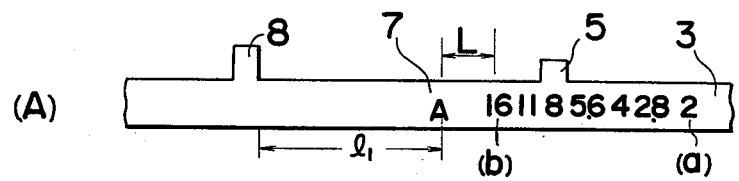
(A)
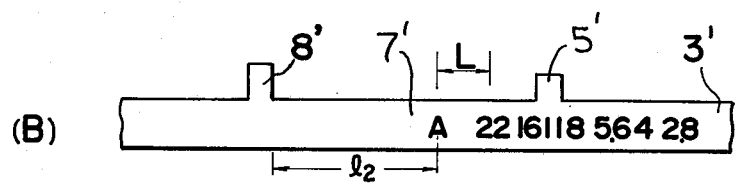
(B)
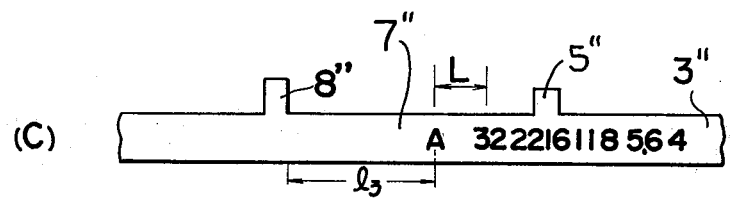
(C)

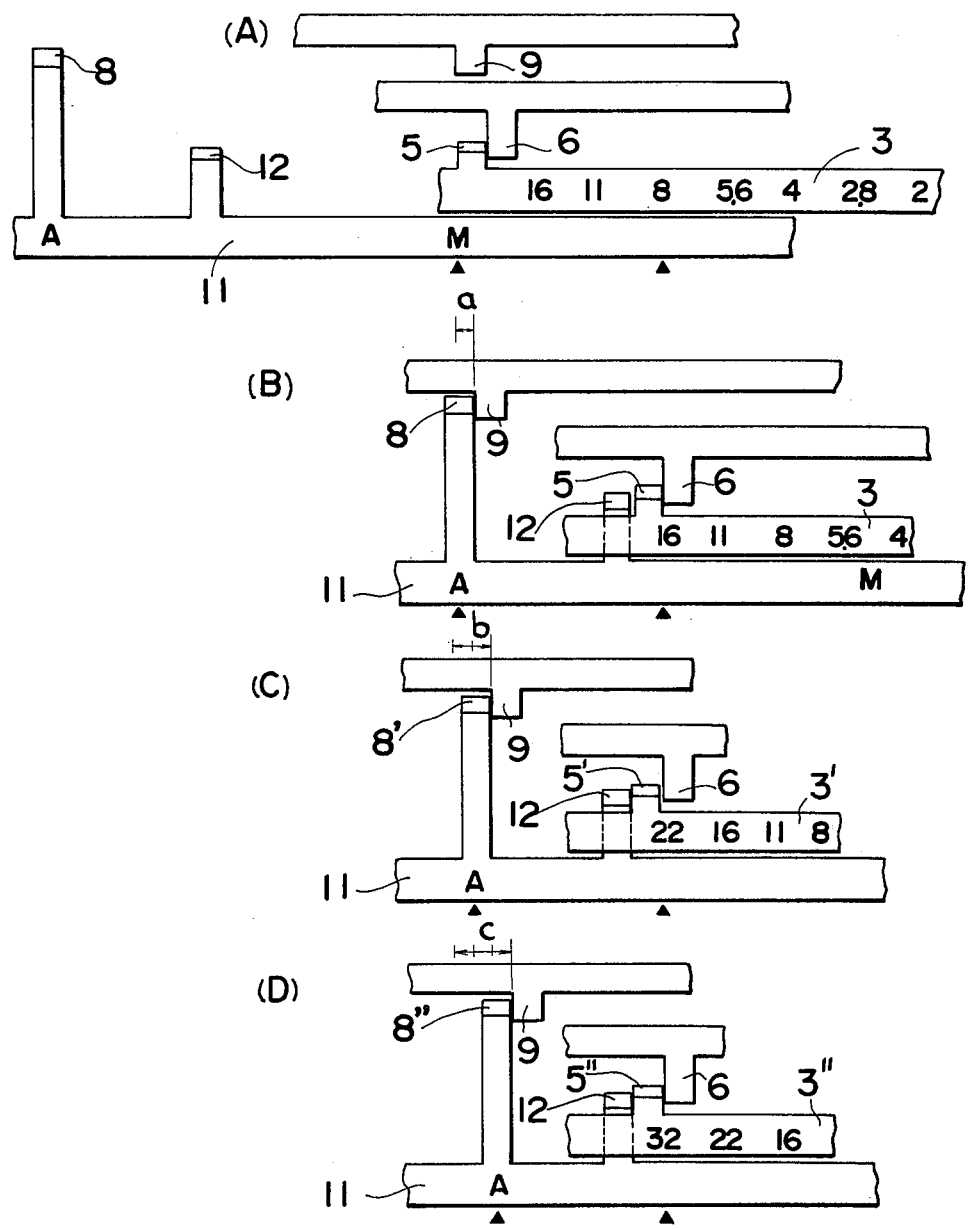

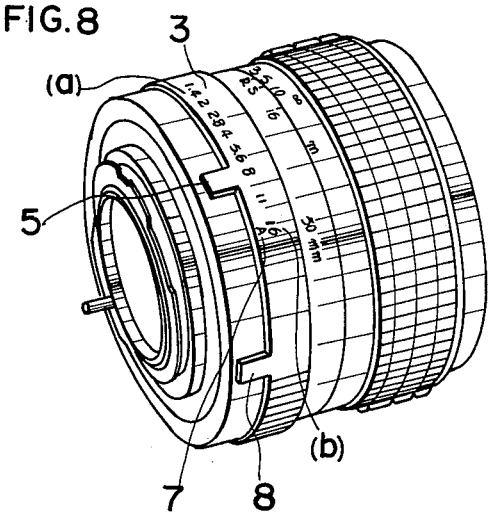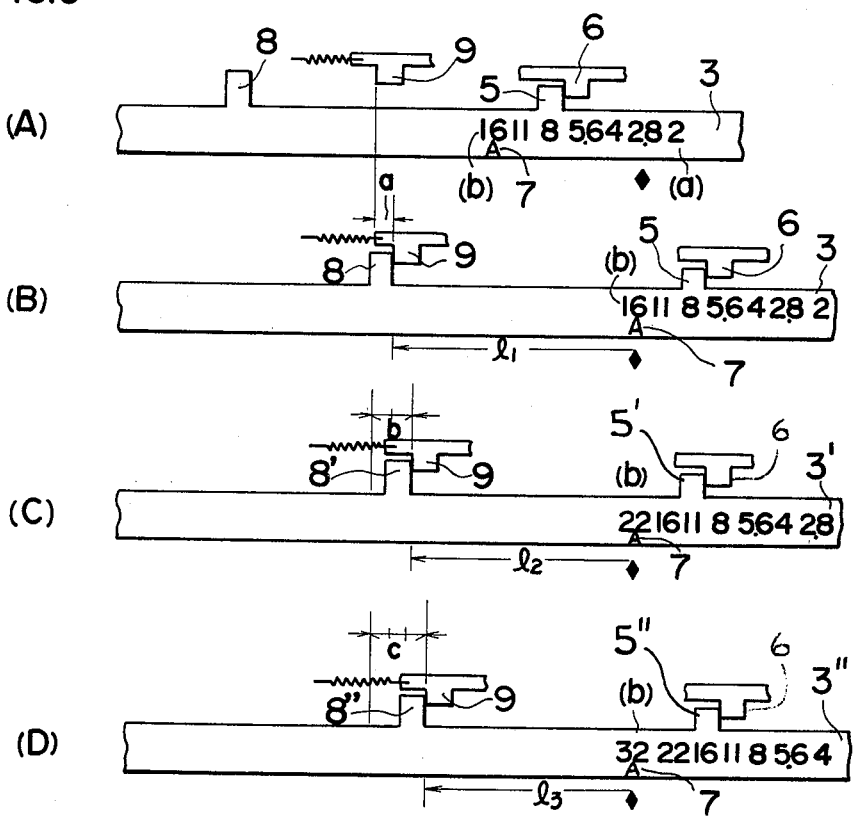

EXCHANGEABLE LENSES FOR USE IN INTERNAL LIGHT MEASURING TYPE SINGLE LENS REFLEX CAMERAS

BACKGROUND OF THE INVENTION

This invention relates to an exchangeable lens for use in an internal light-measuring type single lens reflex camera, and more particularly to an exchangeable lens for use in a camera which is equipped with a diaphragm-priority-automatic-shutter-speed control mechanism for automatically controlling the shutter speed, and a shutter-speed-priority-automatic-diaphragm control mechanism for automatically controlling the aperture.

With a prior art camera equipped with a diaphragm-priority-automatic-shutter-speed control mechanism alone, in case diaphragm-priority-automatic-shutter-speed control is effected, the transmission of only the step-difference between the fully open aperture value and the set aperture value for an exchangeable lens enables the automatic control of the shutter speed. The set aperture value is indicated by indicating means adapted to operate from the direct introduction of light into the finder through an optical system.

In a camera equipped with shutter-speed-priority-automatic diaphragm control and diaphragm-priority-automatic-shutter-speed control mechanisms, the fully open aperture value should be transmitted from the lens to the camera for indicating the aperture value to be set at the time of photographing, when using shutter-speed-priority-automatic-diaphragm control.

If only one kind of an exchangeable lens is used, the transmitting means therefor may be readily provided. However, there are different kinds of exchangeable lenses in the market. In addition, even standard lenses having varying maximum aperture values are on the market (Standard lens . . . 50 mm: F1.2, F1.4, F1.7 and the like).

As a result, there have been attempts to provide a transmitting member having a different configuration on the flat joint lens surface, which is coupled to the camera body, commensurate with the fully open aperture value of each exchangeable lens. An information-receiving member is provided on the flat surface of the camera body which is coupled to the lens, so that information of the fully open aperture value is transmitted to the side of the camera. With this arrangement, a transmitting member projects from the flat joint surface on the lens, so that such an exchangeable lens cannot be used in a prior art camera that does not have a shutter-speed-priority-automatic-diaphragm control mechanism.

However, because of the complexity of the construction of a camera it is quite difficult to provide an information-receiving member on the flat joint surface of the camera body that projects therefrom, resulting in design difficulties. Even if such a transmitting means is provided on the flat joint surface between the camera body and a lens, a dimensional error would be incurred when the transmitting means is mounted. It is well known that such a dimensional error, if any, is a critical problem in the manufacture of cameras.

SUMMARY OF THE INVENTION

It is an object of the present invention to provide an exchangeable lens for use in an internal light-measuring type single lens reflex camera, which is equipped with shutter-speed-priority-automatic-diaphragm control and diaphragm-priority-automatic exposure-time control mechanisms, and to indicate an actual aperture value, on the side of the camera body relative to the shutter speed which has been set by a photographer, when the aperture is set to shutter-speed-priority-automatic-diaphragm control on the side of an exchangeable lens.

More particularly, for indicating an aperture value, at which a picture is to be taken, on the side of a camera body equipped with a shutter-speed-priority-automatic-diaphragm control mechanism, there may be required information of the fully open aperture value of an exchangeable lens. Accordingly, the present invention provides an exchangeable lens which provides information of the fully open aperture value, independently of the type of an exchangeable lens mounted on the camera.

It is another object of the present invention to provide an exchangeable lens for use in the camera of the type described, which allows the use of an exchangeable lens on a prior art camera having no diaphragm-priority-automatic-exposure time control mechanism, i.e., a camera having a shutter-speed-priority-automatic-diaphragm control mechanism alone, or a camera having neither a diaphragm-priority-automatic-exposure-time control mechanism nor a shutter-speed-priority-automatic-diaphragm control mechanism.

To further clarify the objects of the present invention, using photographic equations in accordance with the APEX system, assume that an index character of the intensity of scene light is BV, the film sensitivity SV, the aperture value AV, and the shutter speed TV. Then, as is well known, the conditions of optimum exposure may be represented by the following equation:

$$SV + BV = AV + TV.$$

With an internal light-measuring type automatic exposure control camera, the light measuring system using a fully open aperture is adopted, which utilizes the fully open aperture value $AV_o$ of a lens, and thus its light measuring output $BV - AV_o = BV_o$ is used as a basis of automatic exposure computation. For a general type of diaphragm-priority-automatic shutter-speed control, either one of the following two type systems is used:

$$TV = SV + (BV - AV_o) - AV + AV_o = (SV + BV_o) - AV + AV_o \quad (1)$$

$$TV = SV + (BV - AV_o) - (AV - AV_o) = (SV + BV_o) - P \quad (2)$$

In the system according to equation (1), two sets of information, i.e., the fully open aperture value $AV_o$ and the set aperture value $AV$, are transmitted from the side of an exchangeable lens to the side of a camera body. In the system according to equation (2), the steps extending from the fully open aperture value $AV_o$ to the set aperture value $AV$ of the lens, i.e., a rotational displacement of the diaphragm setting member for an exchangeable lens, is transmitted from the side of the exchangeable lens to the side of the camera body. In this latter case, only a single set of information needs to be transmitted. The present invention is associated with an exchangeable lens according to the system represented by equation (2).

A comparison of both of the above systems reveals that the system represented by equation (2) is advantageous from an economical viewpoint, because only a single set of information is transmitted, although the above advantage is true only from the viewpoint of diaphragm-priority-automatic exposure-time control. More particularly, in the system represented by equation (2), only the information of a set step (P) is utilized from the side of an exchangeable lens, thereby resulting in the shortcoming that an optimum aperture value cannot be calculated with shutter-speed-priority-automatic-diaphragm control. However, an optimum aperture calculation is possible for shutter-speed-priority-automatic-diaphragm control according to the system represented by equation (1), using the equation $AV = (SV + BV_o - TV) + AV_o$, which is a modification of equation (1). As has been described earlier, this is only possible because information of the fully open aperture value ($AV_o$) of the mounted lens is transmitted from the side thereof.

According to the present invention, there is provided a special mechanism for an exchangeable lens having only an information member for stopping-down the aperture steps, whereby an optimum aperture value in the diaphragm-automatic-control is calculated and indicated. According to this system, a member for the step information (P), which is only utilizable in shutter-speed-automatic control, may be utilized for diaphragm-automatic-control, thereby presenting considerable economy and feasibility.

The aforesaid special mechanism is such that, upon computation of an optimum aperture value in diaphragm-automatic-control, based on the equation $AV_o = AV - P$, derived from the equation $P = AV - AV_o$, there is eliminated a member for directly transmitting to the camera body information of the fully open aperture value of the mounted exchangeable lens. The diaphragm setting member for a mounted exchangeable lens is set to a specific position with diaphragm-automatic-control according to the equation $AV = (SV + BV_o - TV) + AV_c - P_c$. $AV_o$ is derived by substituting $AV$ and $P$ in the equation $P = AV - AV_o$ by the actual value $AV_c$ and the rotational displacement $P_c$ of the diaphragm setting member, so that $AV_o$ is indirectly transmitted to the camera body.

BRIEF DESCRIPTION OF THE DRAWINGS

FIGS. 4A, 4B and 4C are plan views of diaphragm setting members according to the invention for use with an exchangeable lens having different fully open aperture values;

FIGS. 5A, 5B, 5C and 5D are illustrative views of various operating conditions of an exchangeable lens according to the present invention, in which FIG. 5a represents an aperture manual setting condition, and FIGS. 5B, 5C and 5D represent respective shutter-speed-priority-automatic-diaphragm control conditions for different exchangeable lenses;

FIGS. 7A, 7B, 7C and 7D are explanatory views showing various operational conditions, in which FIG. 7A represents an aperture manual setting condition, and FIGS. 7B, 7C and 7D represent respective shutter-speed-priority-automatic-diaphragm control conditions for different exchangeable lenses;

FIG. 8 is a perspective view of still another embodiment of the exchangeable lens according to the present invention;

FIGS. 9A, 9B, 9C and 9D are views illustrative of operational conditions thereof of the embodiment of FIG. 8;

DESCRIPTION OF THE PREFERRED EMBODIMENTS

Figure 1:
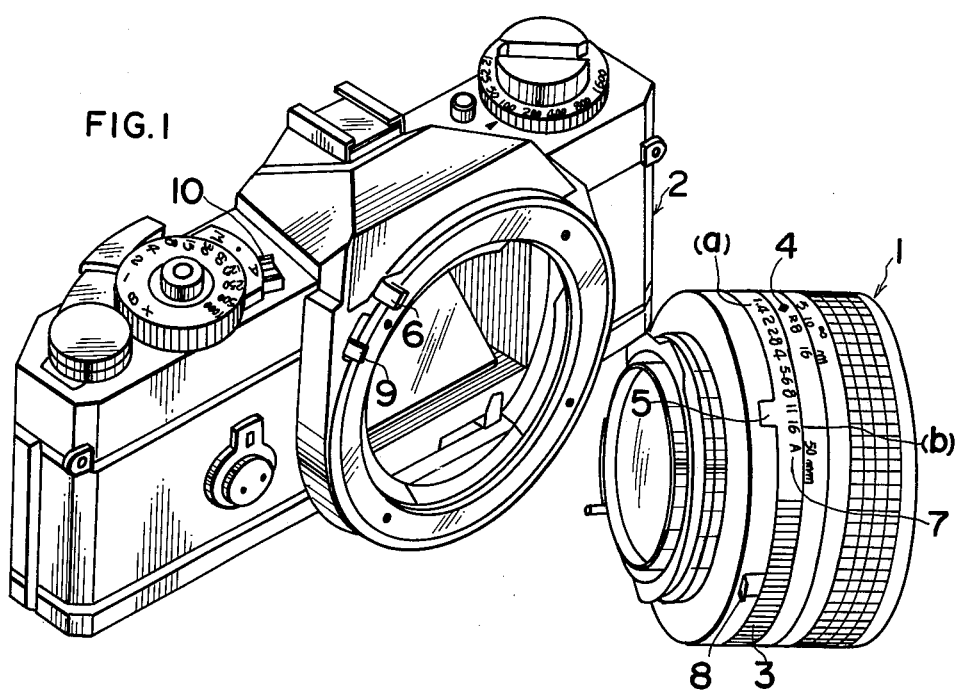
FIG. 1 is a perspective view of an exchangeable lens according to the present invention, showing a condition prior to its being mounted on a camera having shutter-speed-automatic-control and diaphragm-automatic-control means.
Figure 2:
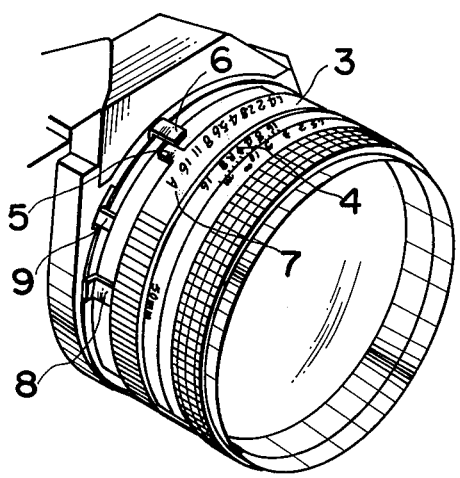
FIG. 2 is a perspective view of an exchangeable lens, showing a condition where the exchangeable lens is mounted on a camera and set to a manual aperture control mode.
Figure 3:
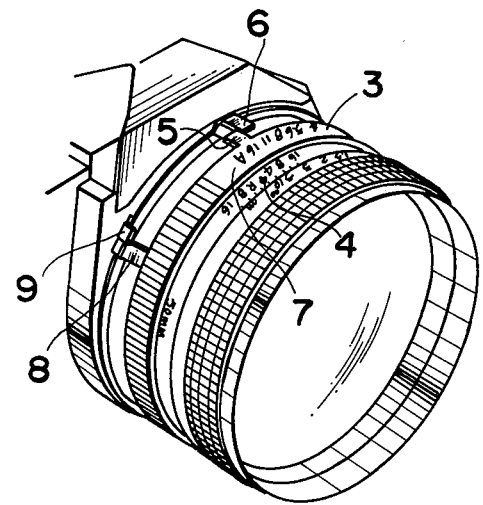
FIG. 3 is a perspective view of an exchangeable lens, showing a condition where the exchangeable lens is mounted on a camera, and set to a diaphragm-automatic-control mode.

FIG. 1 shows a perspective view of an exchangeable lens according to the present invention prior to its being mounted on a camera equipped with a shutter-speed-priority-automatic-diaphragm control mechanism and a diaphragm-priority-automatic-shutter-speed control mechanism. FIG. 2 shows a mounted exchangeable lens, and FIG. 3 shows an exchangeable lens set in the diaphragm-priority-automatic-exposure-time control mode. Exchangeable lens body 1 is adapted to be mounted on camera body 2 equipped with shutter-speed and diaphragm-automatic control mechanisms. Diaphragm setting member 3 which may be rotated, includes aperture values covering a range from a fully open aperture value ($a$) to a minimum aperture value ($b$), which are indicated on the outer periphery of diaphragm setting member 3. Thus, a desired aperture value is set by aligning that desired aperture value with index 4. First transmitting member 5 is formed on diaphragm setting member 3, and is spaced a given distance from the fully open aperture value, irrespective of the type of lens. With respect to FIG. 2, when exchangeable lens 1 is mounted on camera body 2, first transmitting member 5 is brought into engagement with first information receiving member 6, which is provided on camera body 2, and urged counterclockwise. Thus, when diaphragm setting member 3 is set to a given aperture value, first transmitting member 5 transmits information of the step-difference over the range of aperture values from the fully open aperture value ($a$) to the set aperture value, to first information receiving member 6. Diaphragm-automatic control indicating portion 7 is provided on diaphragm setting member 3. When indicating portion 7 is aligned with index 4, the diaphragm is automatically controlled. Indicating portion 7 is spaced a given distance L from the minimum aperture value ($b$), irrespective of the different types of lens, as respectively shown in FIGS. 4A, 4B, 4C. Second transmitting member 8 is provided on diaphragm setting member 3. Second transmitting member 8 is engageable with second information receiving member 9 provided on camera body 2. Second transmitting member 8 transmits information of the minimum aperture value (b) of an exchangeable lens to second information-receiving member 9, only when indicating portion 7 is set to index 4.

The length of first transmitting members 5, 5', 5" is shorter than second transmitting members 8, 8', 8" respectively associated therewith along a direction parallel to the optical axis as shown in FIG. 4 with continuing reference to FIG. 1. With further reference to FIGS. 5A, 5B with exchangeable lens 3 mounted on the camera, first transmitting member 5 passes beneath second information receiving member 9 and does not engage it but only engages first information receiving member 6. Second transmitting member 8 engages second information receiving member 9, only when diaphragm setting member 3 is rotated so that diaphragm-automatic-control indicating portion 7 is aligned with index 4.

Also, the distances l1, l2, l3 of respective second transmitting members 8, 8', 8' vary according to the type of an exchangeable lens, as shown in FIGS. 4A, 4B, 4C so that second transmitting members 8, 8', 8" respectively transmit different predetermined reference aperture values. Thus, in cases of respectively smaller aperture values of the different type exchangeable lenses 3, 3', 3", second transmitting members 8, 8', 8" respectively also transmit the difference between the reference aperture value and the minimum aperture value.

As shown in FIG. 5B, when the shutter-speed-priority-automatic-aperture control mode is set, second transmitting member 8 moves second information receiving member 9 a distance a so as to transmit the minimum aperture value F16.

As shown in FIG. 5C, with an exchangeable lens having a one-step lower aperture value F22, second transmitting member 8 moves information receiving member 9 a distance b which is one-step longer than distance a to transmit minimum aperture value F22.

As shown in FIG. 5D, with an exchangeable lens having an additional one-step lower aperture value F32, second transmitting member 8 moves second information receiving member 9 a distance c, which is one-step longer than distance b to transmit minimum aperture value F32.

Mode control switching member 10 (FIG. 1) is provided on camera body 2 and is switchable between position M (manual mode) and position A (diaphragm-priority-automatic-shutter-speed control). With the above described arrangement, with exchangeable lens 1 mounted on camera body 2, and mode control switching member 10 set to diaphragm-priority-automatic-shutter-speed control mode A or manual mode M, and diaphragm setting member 3 is rotated to set a given aperture value (for instance, as shown in FIG. 2 and FIG. 5A, an aperture value of F 5.6), first transmitting member 5 transmits to first information receiving member 6 the step difference between the fully open aperture value F2 and the set aperture value F5.6, as shown in FIG. 5A. As a result, diaphragm-priority-automatic-shutter-speed control or manual photography may be carried out in the same manner as in the prior art. Second transmitting member 8 is designed to engage second information receiving member 9, only when indicating portion 7 is aligned with index 4 as shown in FIG. 5B. Thus, with the aperture value indicated on diaphragm setting member 3 aligned with index 4, second transmitting member 8 does not engage second information receiving member 9, so that non-essential information is not transmitted and hence diaphragm-priority-automatic-shutter-speed control or manual photography may be effected accurately.

For shutter-speed-priority-automatic-diaphragm control photography, the shutter speed setting member on the camera body is operated to set a given shutter speed, and then diaphragm setting member 3 is rotated to align indicating portion 7 with index 4 (FIG. 3 and FIG. 5B). First transmitting member 5 then transmits information of the step difference between the fully open aperture value and a minimum aperture value to first information receiving member 6, while second transmitting member 8 transmits a minimum aperture value of the exchangeable lens to second information receiving member 9. In other words, second transmitting member 8 moves second information receiving member 9 a distance a, as shown in FIG. 5B, for transmitting a minimum aperture value of the exchangeable lens.

A computing mechanism (either mechanical or electrical) within the camera body computes information from the first and second transmitting members, so that the fully open aperture value of the mounted exchangeable lens is derived, and thus the aperture value at the time of actual photographing according to the shutter-speed-priority-automatic-diaphragm control mode is indicated.

In cases other than that shown in FIG. 5B, second transmitting member 8 transmits information of the minimum aperture value of a mounted exchangeable lens, in a like manner as described above. Thus, when an exchangeable lens having diaphragm setting member 3' of FIG. 5C is mounted and which has aperture values extending from the fully open aperture value F2.8 to the minimum aperture value F22 and when indicating portion 7 of diaphragm setting member 3' is set to index 4, second transmitting member 8' is moved a distance equal to the standard distance L for second information receiving member 9 to be moved, plus distance b equal to the difference between F22 and F16, so that the minimum aperture value F22 may be transmitted. Accordingly, even in case an exchangeable lens of a different type is mounted, the second transmitting member thereof transmits information representing the minimum aperture value of the exchangeable lens to second information receiving member 9.

In the case of an exchangeable lens with diaphragm setting member 3" of FIG. 5D, i.e., when an exchangeable lens having aperture values extending from fully open aperture value F4 to minimum aperture value F32 is mounted on the camera body, with diaphragm setting member 3" set to the shutter-speed-priority-automatic-diaphragm control mode, then second transmitting member 8" is moved a distance equal to the standard distance L for second information receiving member 9 to be moved plus distance c equal to the difference between F32 and F16 so that the minimum aperture value F32 is transmitted to second information receiving member 9.

Figure 6:
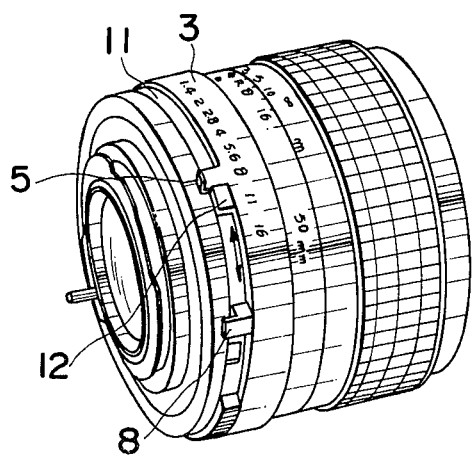
FIG. 6 is a perspective view illustrative of another embodiment of an exchangeable lens according to the present invention.

The following description is taken with respect to FIG. 6, which represents another embodiment of an exchangeable lens, and FIGS. 7A, 7B, 7C and 7D show various operating conditions of that embodiment. Rotatable member 11 is used to switch between automatic (auto) and manual diaphragm control, and is provided adjacent to diaphragm setting member 3. Projection member 12, on rotatable member 11 is adapted to engage diaphragm setting member 3 for setting it to a minimum aperture value, when rotatable member 11 is set to an auto diaphragm control. In a manner similar to the preceding embodiment, first transmitting member 5 is provided on diaphragm setting member 3. However, second transmitting member 8 is provided on rotatable member 11.

Accordingly, as shown in FIG. 7A, in the manual diaphragm control, first transmitting member 5 of diaphragm setting member 3 transmits only a step-difference, between fully open aperture value F2 and a set aperture value F5.6, to first information receiving member 6. Accordingly, diaphragm-priority-automatic-shutter-speed control may be satisfactorily carried out even in a case of a camera equipped with shutter-speed-priority automatic-diaphragm control and diaphragm-priority-automatic exposure time control mechanisms, or with a diaphragm-priority automatic-shutter-speed control mechanism alone.

As shown in FIG. 7B, when rotatable member 11 is operated to set the shutter-speed-priority-automatic-diaphragm control mode, engaging member 12 forcibly moves diaphragm setting member 3 to a minimum aperture value F16, so that first transmitting member 5 transmits information of the difference between the fully open aperture value and the minimum aperture value, while second transmitting member 8 moves second information receiving member 9 a given distance as in the preceding embodiment, thereby transmitting the minimum aperture value F16 of the mounted exchangeable lens.

Further, in case a different type exchangeable lens is mounted on the camera body, as shown in FIG. 7C, in which for instance, the exchangeable lens has aperture values extending from a fully open aperture value F2.8 to a minimum aperture value F22 and shutter-speed-priority-diaphragm control is selected, second transmitting member 8' is designed to be moved a distance one step longer than that for the reference aperture value F16, as in the preceding embodiment, so that the minimum aperture value F22 is transmitted.

Furthermore, for an exchangeable lens having aperture values extending from Fmax 4 to Fmin 32 as shown in FIG. 7D, second information receiving member 9 is moved one step further than that of second information receiving member 9 of FIG. 7C, so that the minimum aperture value is transmitted.

The following description is in conjunction with FIGS. 8 and 9A, 9B, 9C, 9D respectively showing a perspective view of another embodiment, and explanatory views of different operating conditions of that embodiment. In this embodiment, indicating portion 7 is provided in close vicinity, but in opposing relation, to minimum aperture value (b) appearing on diaphragm setting member 3. Thus, indicating portion 7 is positioned at the minimum aperture value (b) of the exchangeable lens. More particularly, the distance L as shown in FIGS. 4A, 4B, 4C is eliminated and distances l1, l2, l3, dependent on the minimum aperture values, are the same as those shown in FIGS. 4A, 4B, 4C.

Also in this embodiment, when the shutter-speed-priority automatic-diaphragm control mode is selected, as shown in FIGS. 9B, 9C, 9D, second transmitting members 8, 8', 8" respectively move second information receiving member 9 the respective distances a, b, c, depending on the type of exchangeable lens.

Figure 5:
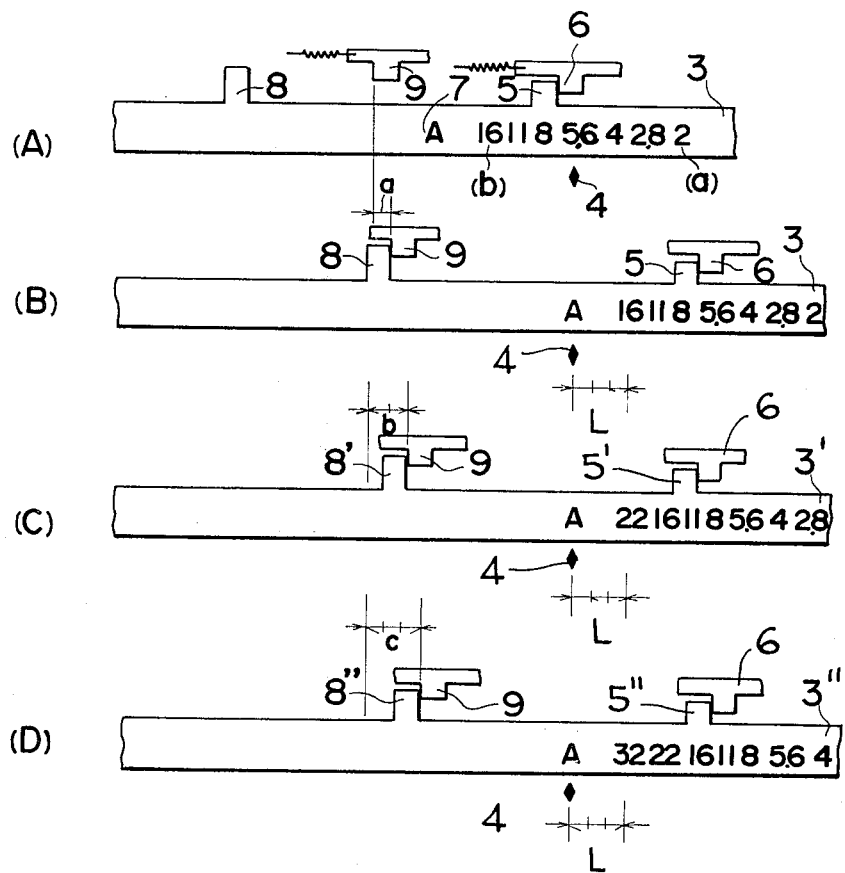

This embodiment of the exchangeable lens also permits its satisfactory use with prior art cameras. In other words, in the embodiments as shown in FIGS. 4 and 5, there is provided a given distance L from a minimum aperture value (b) of an exchangeable lens to indicating portion 7, while diaphragm setting member 3 may be rotated the additional distance L from the minimum aperture value (b). Therefore, with the diaphragm manually set when diaphragm setting member 3 is rotated to its extremity to be set to the fully open aperture value, diaphragm setting member 3 may be rotated to indicating portion 7 which is further from the minimum aperture value (b), so that first information receiving member 6 is rotated to an excessive extent. As first information receiving member 6 sets the exposure, an improper exposure will result. In other words, the diaphragm mechanism for the lens itself transmits information pertaining to a reduced aperture value to the camera body, so that the exposure computation is carried out according to the information thus transmitted. The embodiment in accordance with FIGS. 8 and 9A, 9B, 9C and 9D avoids the aforesaid shortcoming.

Figure 10:
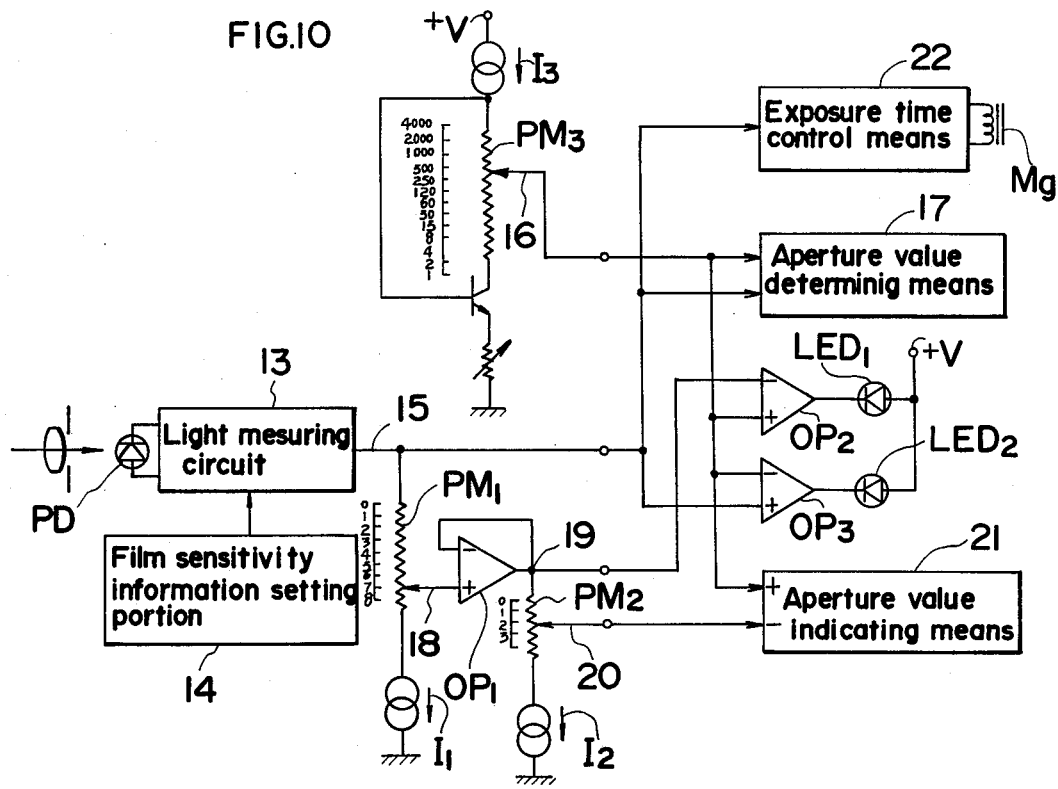
FIG. 10 is a block diagram showing an indicating circuit operating in conjunction with an indicating means adapted to be mounted on the side of a camera body.

FIG. 10 shows one embodiment of an indicating circuit provided on the side of a camera body, for indicating a preselected aperture value according to information from the first transmitting member and the second transmitting member for the previously described exchangeable lenses.

Light measuring circuit 13 includes light receiving element PD, which measures the light transmitted through an objective lens to provide a light measuring value which has been logarithmically compressed, and then adds thereto film sensitivity information obtained from film sensitivity information setting portion 14 to provide an output at terminal 15. Potentiometer PM3 operates in conjunction with the setting of the shutter speed to generate shutter speed information. This provides a voltage commensurate with the set shutter speed at slidable terminal 16, and which voltage is input, together with output 15 of light measuring circuit 13, to aperture determining means 17, which determines the difference between both signals, whereby the optimum aperture value at the set shutter speed is obtained. Therefore, output 15 of light measuring circuit 13 is obtained with the fully open lens aperture, while the shutter speed information provides a higher voltage signal, as the shutter speed becomes higher. In FIG. 10 the numerals adjacent potentiometer PM3 respectively represent the denominators of shutter speeds. An optimum aperture value is obtained, when voltage output 15 is equal to the voltage at terminal 16 when the aperture is stopped-down. However, the voltage difference between voltage output 15 less the voltage at slidable terminal 16 represents the number of stopped-down steps from the fully open aperture. Aperture determining means 17 may be of a suitable known type voltmeter, in which the position of the aperture is determined by a pointer. Constant current circuit $I_3$ provides a constant current to potentiometer PM3.

Potentiometer PM1 provides a voltage representing the stopping-down steps between the fully open aperture value and the minimum aperture value of an objective lens. The numerals adjacent potentiometer PM1 represent the number of such steps. Sliding terminal 18 is operated according to the presetting operation of first transmitting member 5 serving as a diaphragm presetting means for the exchangeable lens. For instance, assume that the fully open aperture value is F1.4 and the minimum aperture value is F16, then the resulting stopping-down steps is 7. Thus, slidable terminal 18 should be set to numeral 7. Since constant current flows through potentiometer PM1 from constant current circuit I$_1$, a voltage is obtained at slidable terminal 18 of a lower value than the output of light measuring circuit 13 in an amount equivalent to the aforesaid stopping-down steps. This voltage is input through impedance converting operational amplifier OP1 to terminal 19 of potentiometer PM2. Potentiometer PM2 generates an auxiliary signal. A constant current flows from constant current circuit I2 to potentiometer PM2. Slidable terminal 20 provides a lower voltage signal than that at terminal 19 of potentiometer PM2 commensurate with the position of terminal 20. Slidable terminal 20 is operated by second transmitting member 8 of the exchangeable lens and is set to a position dependent on the stopping-down steps between the minimum aperture value and a given predetermined aperture value which has been set in accordance with a particular design. Stated differently, the numerals adjacent potentiometer PM2 represent the foregoing stopping-down steps. For instance, assume that the minimum aperture value for a lens is F16 as in the preceding case, and the predetermined aperture value is F32, then the number of stopping-down steps is two, so that terminal 20 should be moved to numeral 2 to transmit the minimum aperture value information. In this manner, slidable terminal 20 provides a voltage signal which is lower than the output of light measuring circuit 13 by a value corresponding to the difference in steps between the open aperture value of an objective lens and the aforesaid predetermined or designed aperture value. This voltage signal and the voltage signal from slidable terminal 16 of potentiometer PM3 are both input to aperture value indicating means 21, where the former voltage is subtracted from the latter voltage.

The following is a more detailed description of the results of the foregoing subtraction. Assume that output 15 is derived from light measuring circuit 13 with a fully open aperture and that the setting of the shutter speed provides an optimum exposure at the fully open aperture, then output voltage 15 is equal to the voltage at terminal 16, whereas the voltage at terminal 20 is lower than the foregoing voltages by a given number of stopping-down steps (in this instance, 7 + 2 = 9 steps). The voltage at terminal 20 may be regarded as being an optimum shutter speed signal at the planned aperture value. Assume that aperture value indicating means 21 indicates F32 with zero voltage input and that a pointer of indicating circuit 21 is deflected toward a smaller F-number (larger aperture), as the input is increased. When the pointer is deflected through an angle corresponding to the difference in steps between the set shutter speed and the shutter speed at F32, then the pointer indicates an aperture of F1.4, which is lower by nine steps. In other words, in shutter-speed-priority-automatic-diaphragm control, a preselected aperture value is not represented by the sum of a fully open aperture value for an objective lens and the stopping down steps obtained from determining means 17. Instead, the fully open aperture value signal is represented by the number of the steps between the predetermined aperture value and the fully open aperture value. In this manner, a warning signal may be readily obtained when the aperture remains outside of an interlocking range. This will be described in more detail hereinafter.

OP2 and OP3 represent operational amplifiers, while LED1, LED2 represent light-emitting diodes for a load. Thus, when the output of respective operational amplifiers OP2 and OP3 is at grounding potential, diodes LED1, LED2 are lit, thereby providing a warning of an "out of interlocking" condition. The voltage at slidable terminal 16 is input to the inverting terminal of operational amplifier OP3. In this respect, higher voltages represent higher shutter speeds. Since light measuring output 15 is input to the non-inverting terminal of operational amplifier OP3, if the shutter speed signal voltage is at the same level as that of light measuring output 15 at the fully open aperture, the set shutter speed provides optimum exposure. Taking this into consideration, when the shutter speed is set to a higher level than that shutter speed which provides optimum exposure, then the inverting input terminal voltage of operational amplifier OP3 is higher than that of the non-inverting terminal, so that the output of operational amplifier OP3 is lowered to ground level, and hence light-emitting diode LED2 is lit. Additionally, the voltage corresponding to a light measuring output at the minimum aperture value is impressed on the inverting terminal of operational amplifier OP2, and the voltage corresponding to the shutter speed represented by the voltage appearing at slidable terminal 16 is input to the non-inverting terminal of operational amplifier OP2, so that in case both voltages are equal, then the set shutter speed provides optimum exposure at the minimum aperture. Taking this into consideration, when the voltage at slidable terminal 16 is low, i.e., the set shutter speed is low, the aperture is out of interlocking range at the smaller aperture end of the range, as compared with the minimum aperture, and hence the voltage at terminal 16 is lowered to the ground potential output of operational amplifier OP2, so that light-emitting diode LED1 is lit. This type of indication may be readily accomplished, because a signal of lower potential than the light measuring output at the fully open aperture by the difference in stopping-down steps between the fully open aperture value and the minimum aperture value has been already obtained.

Exposure control means 22 is adapted to be operated according to output 15 of light measuring circuit 13.

Figure 11:
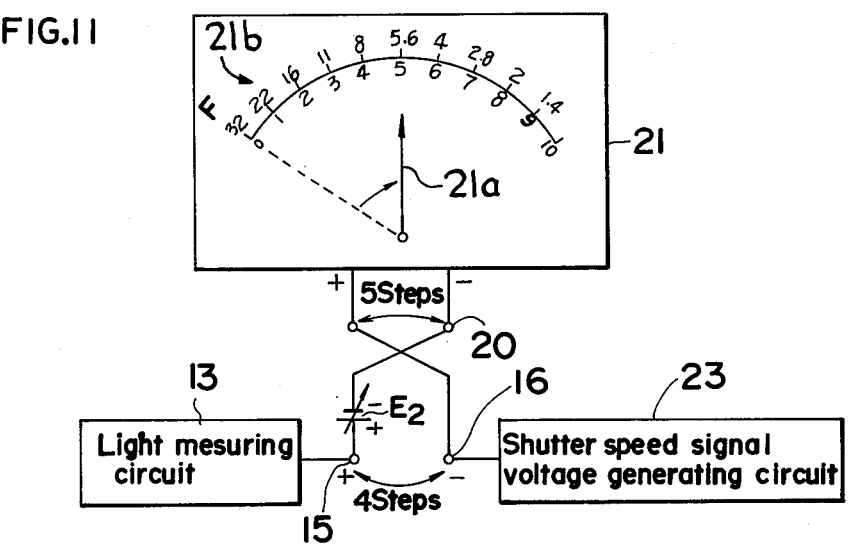
FIG. 11 is a plan view of the indicating surface of an indicating means in the indicating circuit of FIG. 10.

FIG. 11 shows one example of indicating means 21. Variable voltage source E2 represents potentiometers PM1 and PM2. Shutter speed signal generating circuit 23 includes potentiometer PM3. The other components are represented by reference numerals identical to those of FIG. 10. Aperture value indicating means 21, for example a meter, indicates the difference in steps between the shutter speed with predetermined aperture value F32 and the set shutter speed, as has been described earlier, so that pointer 21a is deflected to the right to an extent corresponding to the steps extending from F32 to a desired aperture value. The numerals in the lower row of scale 21b represent the steps, while the numerals in the upper row represent aperture values corresponding thereto.

Figure 12:
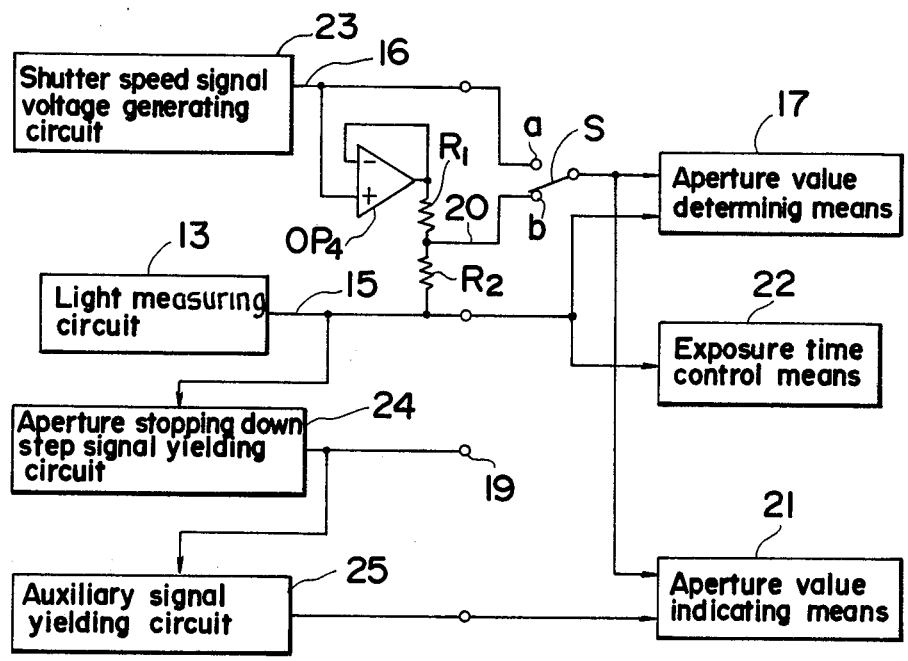
FIG. 12 is a block diagram illustrative of the essential part of the embodiment of the indicating circuit.

FIG. 12 shows another embodiment of the indicating circuit, which includes a programmed shutter function to the embodiment of FIG. 10. Identical components similar to those of FIG. 10 are designated like reference numerals. Shutter speed signal voltage generating circuit 23 generates voltage signal 16 corresponding to the set shutter speed, and corresponds to potentiometer PM3 and its associated circuits. Aperture stopping-down step yielding circuit 24 provides a signal corresponding to the stopping-down steps for an objective lens, and thus corresponds to potentiometer PM1 of FIG. 10. Auxiliary signal yielding circuit 25 generates an auxiliary signal corresponding to the difference in stopping-down steps between the aperture value of an objective lens and a predetermined aperture value, and thus corresponds to potentiometer PM2 of FIG. 10. The input signals and operational principle of aperture value determining means 17 and aperture value indicating means 21 are exactly the same as the embodiment of FIG. 10. The embodiment of FIG. 12 thus represents a simplified modification of FIG. 10. Operational amplifier OP4, voltage-dividing resistors R1, R2 and change-over switch S provide a programming function. The lower terminal of voltage-dividing resistor R2 is connected to output 15 of light measuring circuit 13. When switch S is at contact $a$, exposure control is then effected in the shutter-speed-priority control mode as in the circuit of FIG. 10. When switch S is at contact $b$, then the voltage signals which have been obtained by dividing the voltage corresponding to the set shutter speed through resistors R1, R2, are impressed on aperture value determining means 17, aperture value indicating means 21 and the associated circuits thereof. In programmed shutter speed operation, the shutter speed is set to a shutter speed (normally 1/30 second) which is the limit for hand-held cameras. Operational amplifier OP4 is an impedance converting circuit, and the voltage at the top terminal of resistor R1 is of the same level as the output of shutter speed signal voltage generating circuit 23. Assume that R1 = R2, then the voltage at terminal 20 is a signal corresponding to one-half the difference between the voltage signal corresponding to a shutter speed 1/30 second and light measuring output 15 with a fully open aperture. The signal at terminal 20 is also one-half the stopping-down steps for optimum exposure at a shutter speed of 1/30 second. The signal at terminal 20 is input to aperture value determining means 17 and aperture value indicating means 21. Now assume that the optimum exposure time at a fully open aperture is 1/2000 second, then the difference from a set shutter speed of 1/30 second is six steps, and thus a signal corresponding to a shutter speed of 1/250 second (which corresponds to one-half of six steps) appears at terminal 20. Aperture value determining means 17 determines the optimum stopping-down steps relative to the above shutter speed, and exposure time control means 22 determines the optimum exposure time at the aperture value used. In other words, exposure is determined in two ways, i.e., by the shutter speed and the aperture value, separately.

Meanwhile, exposure time control means 22 is operated according to light measuring output 15, after the diaphragm has been stopped-down. Light measuring circuit 13 may be of any type, such as a TTL light measuring type, a film-surface-reflecting light measuring type and similar measuring devices. In the aforesaid embodiments, light measuring circuit 13 is described as being a means for indicating the aperture values. Since a signal corresponding to the aperture value is also equivalent to the shutter speed signal in determining the exposure, the aperture value according to a diaphragm-priority-automatic-exposure-time control system is set by means of potentiometer PM3, and the shutter speed may be indicated on aperture value indicating means 21. A signal corresponding to a fully open aperture value is introduced into an operational circuit in a manner such that the signal corresponding to the step and a signal corresponding to the difference in steps between the predetermined aperture value and the minimum aperture value of an objective lens are added to the signal corresponding to the set shutter speed. As a result, a signal for indicating an "out of interlocking range" condition for exposure control may be readily derived by utilizing a signal corresponding to a variable step number. Additionally, a preselected aperture value may be indicated without using a complicated arrangement in which, for instance, a pointer is shifted relative to an indicating member.

It should be noted that various modifications and alterations may be effected within the scope of the present invention, as defined in the appended claims. For example:

(1) A stopping-down step signal generating circuit for generating an electric signal corresponding to the variable stopping-down steps for aperture values of an objective lens may be set and operated in association with the presetting operation of a diaphragm presetting means of an exchangeable lens.

(2) A circuit, in which the light measuring circuit signal less the output of the stopping-down step signal generating circuit is subtracted from a signal corresponding to the shutter speed, may also be used. Thus, when the output of the circuit is negative, the graduations of potentiometer PM3 and aperture value indicating means 21 should be respectively changed into aperture value and shutter speed units. Moreover, switching from a shutter-speed-priority control mode to a diaphragm-priority mode is also possible. Furthermore, the aperture value may be indicated by a digital indicating means including an analog-digital converting circuit, rather than by an analog indicating means such as a meter. The reason why a predetermined aperture value of F32 is used is that when exchangeable lenses are classified according to their minimum aperture value, then the exchangeable lenses may be classified into three groups, i.e., lenses of F16, F22 and F32. In principle, a minimum aperture value lens of F44 or other minimum aperture lens may be used. However, F32 is preferable from a consideration of the circuit arrangement and the power source voltage.

What is claimed is:

1. A series of exchangeable lenses for use in a single lens reflex camera, each of said exchangeable lenses comprising:
    a lens barrel including at least one lens and a diaphragm;
    a fixed index on the outer surface of said lens barrel;
    a diaphragm setting ring including $f$-number graduations ranging from a maximum $f$-number to a minimum $f$-number of said exchangeable lens, said ring being rotatable to a plurality of positions for aligning any one of said $f$-number graduations with said index to be set to a desired $f$-number;
    first means projecting from said ring and spaced a predetermined first distance, common to each exchangeable lens of said series, from said minimum $f$-number graduation in the rotational direction of said ring such that the amount of the rotation of said first means with said ring set to a desired $f$-number from the minimum $f$-number corresponds to the step difference between the minimum and the desired $f$-number; and
    second means projecting from said ring and spaced a predetermined second distance from said maximum $f$-number graduation in said rotational direction, said second distance being dependent on the value of the maximum f-number of each exchangeable lenses of said series such that said second means is at a position dependent on the value of the maximum f-number of said exchangeable lens with said ring set to the maximum f-number.

2. A series of exchangeable lenses as in claim 1, wherein said second distance increases with decreasing values of the maximum f-number of said exchangeable lens.

3. A series of exchangeable lenses as in claim 2, wherein each of said exchangeable lenses further comprises a mark for indicating automatic aperture control, said mark being arranged on said ring in corresponding relation with said maximum f-number graduation.

4. A series of exchangeable lenses for use in a single lens reflex camera, each of said exchangeable lenses comprising:
   a lens barrel including at least one lens and a diaphragm;
   a fixed index on the outer surface of said lens barrel;
   a rotatable diaphragm setting ring including f-number graduations ranging from a maximum f-number to a minimum f-number of said exchangeable lens, a mark spaced a predetermined first distance from said maximum f-number graduation in the direction of rotation of said ring, said ring being rotatable to a plurality of positions for aligning any one of said f-number graduations with said index and into a position wherein said mark aligns with said index;
   first means projecting from said ring and spaced a predetermined second distance from said minimum f-number graduation in said rotational direction; and
   second means projecting from said ring and spaced a predetermined third distance from said mark in said rotational direction, said third distance being dependent on the value of the maximum f-number of each exchangeable lens of said series and said first and second distance being common to each exchangeable lens of said series.

5. A series of exchangeable lenses as in claim 4, wherein said third distance increases with decreasing values of the maximum f-number of said exchangeable lens.

6. A series of exchangeable lenses for use in a single lens reflex camera, each of said exchangeable lenses comprising:
   a lens barrel including at least one lens and a diaphragm;
   a fixed index on the outer surface of said lens barrel;
   a diaphragm setting ring including f-number graduations ranging from a maximum f-number to a minimium f-number of said exchangeable lens, said ring being rotatable to a plurality of positions for aligning any one of said f-number graduations with said index to be set to a desired f-number;
   first means projecting from said ring and spaced a predetermined first distance common to each exchangeable lens of said series from said minimum f-number graduation in the direction of rotation of said ring.
   a member adjacent to said ring and rotatable between a manual aperture setting position and an automatic aperture control position;
   second means projecting from said rotatable member and engageable with said first means, said second means being relatively positioned with respect to said first means such that said second means rotates said ring through the engagement with said first means to a position in which said maximum f-number graduation aligns with said index when said rotatable member is rotated to the automatic aperture control position; and
   third means projecting from said rotatable member and arranged at a predetermined portion of said rotatable member such that said third means is positioned in dependence on the maximum f-number of each exchangeable lens of said series when said rotatable member is rotated to the automatic aperture control position.

7. A series of exchangeable lenses as in claim 6, wherein each of said exchangeable lenses further comprises:
   a second fixed index on the outer surface of said lens barrel;
   a first mark on said rotatable member for manual aperture setting with said first mark in alignment with said second index; and
   a second mark on said rotatable member for automatic aperture setting with said second mark in alignment with said second index.

8. A series of exchangeable lenses as in claim 7, wherein said second mark is arranged at said predetermined portion of said rotatable member.

9. In a single lens reflex camera having a camera body, an exchangeable lens having an objective lens and a diaphragm mountable on said camera body, and an exposure factor indicating device comprising:
   means for aperture setting provided on said exchangeable lens and being settable to a desired one of a plurality of manual aperture setting positions and to an automatic aperture control position;
   first and second information receiving members provided on said camera body;
   a first information transmitting member provided on said aperture setting means for transmitting to said first information receiving member first information of the step-difference from a minimum to the preset f-number of said exchangeable lens independently of the set position of said aperture setting means;
   a second information transmitting member provided on said aperture setting means for transmitting to said second information receiving member second information of the maximum f-number of said exchangeable lens when said aperture setting means is set to the automatic aperture control position;
   means coupled with said first and second information receiving members for combining said first and second information with said aperture setting means set to said automatic aperture control position to generate a first signal representative of the minimum f-number of said exchangeable lens;
   means for generating a second signal representative of a manually selected shutter speed;
   means for generating a third signal representative of a set film sensitivity and the intensity of the scene light having passed through said objective lens and aperture in its fully open position, said aperture being formed by said diaphragm;
   means for combining said first and third signals to generate a fourth signal; and
   an aperture indicating means responsive to the difference between said second and fourth signals for indicating an aperture to be automatically controlled.

10. An exposure factor indicating device as in claim 9, wherein said aperture setting means is rotatable and includes f-number graduations ranging from a minimum to a maximum f-number of said exchangeable lens and a mark for automatic aperture control, said f-number graduations and mark extending in the rotational direction of said aperture setting means, and wherein said exchangeable lens includes a fixed index on the outer surface thereof, said manual aperture setting positions being positions in which any one of said f-number graduations are aligned with said index and said automatic aperture control position being an alignment of said mark with said index.

11. An exposure factor indicating device as in claim 10, wherein said mark is spaced a predetermined distance from said maximum f-number graduation in said rotational direction.

12. An exposure factor indicating device as in claim 10, wherein said mark is at the same position as said maximum f-number graduation.

13. A series of exchangeable lenses for use in a single lens reflex camera, each of said exchangeable lenses comprising:
    a diaphragm setting ring settable to a plurality of f-numbers including the maximum and minimum f-numbers of said exchangeable lens;
    first means movable with said ring and being in a predetermined position common to each exchangeable lens of said series with said ring set to the minimum f-number, the amount of the movement of said first means with said ring set to a desired f-number from the minimum f-number corresponding to the step-difference between the minimum and the desired f-number; and
    second means movable with said ring and being at a predetermined position dependent on the value of the maximum f-number of said exchangeable lens with said ring set to the maximum f-number.

14. A series of exchangeable lenses as in claim 13, further comprising a movable member interconnected with said ring, said second means being provided on said movable member.

15. A series of exchangeable lenses as in claim 13, wherein said second means is provided on said ring.

16. A series of exchangeable lenses as in claim 13, wherein said first means is provided on said ring.

17. A series of exchangeable lenses for use in a single lens reflex camera, each of said exchangeable lenses comprising:
    a fixed member and a rotatable diaphragm setting ring one of which includes an index and the other of which includes sequentially indicated f-number graduations ranging from the maximum to the minimum f-numbers of said exchangeable lens, and a mark spaced a predetermined distance from said maximum f-number graduation in the direction of rotation of said ring, said ring being rotatable to a plurality of positions for aligning any one of said f-number graduations with said index and into a position wherein said mark aligns with said index;
    first means movable with said ring and being at a predetermined position common to each exchangeable lens of said series with said ring in a position wherein said minimum f-number graduation aligns with said index, the amount of the movement of said first means with said ring set to a position wherein a desired one of said f-number graduations aligns with said index and to said position wherein said mark aligns with said index corresponding to the step-difference between said minimum f-number graduation and the desired f-number graduation and the step-difference between the minimum f-number graduation and the mark, respectively; and
    second means movable with said ring and being in a predetermined position dependent on the value of the maximum f-number of said exchangeable lens with said ring set to said position wherein said mark aligns with said index.

* * * * *

UNITED STATES PATENT OFFICE
CERTIFICATE OF CORRECTION

PATENT NO. : 4,118,726
DATED : Oct. 3, 1978
INVENTOR(S) : Kuramoto et al

It is certified that error appears in the above-identified patent and that said Letters Patent are hereby corrected as shown below:

[30] Foreign Application Priority Data

Feb. 19, 1976 (JP) Japan................51-17564

Nov. 24, 1976 (JP) Japan...............51-141500

Signed and Sealed this

Third Day of April 1979

[SEAL]

Attest:

RUTH C. MASON
Attesting Officer

DONALD W. BANNER
Commissioner of Patents and Trademarks